United States Patent
Kuroda et al.

(10) Patent No.: US 6,178,057 B1
(45) Date of Patent: Jan. 23, 2001

(54) DISK UNIT AND READ/WRITE CONTROL METHOD

(75) Inventors: Takashi Kuroda; Yuji Kigami, both of Yamato (JP)

(73) Assignee: International Business Machines Corporation, Armonk, NY (US)

( * ) Notice: Under 35 U.S.C. 154(b), the term of this patent shall be extended for 0 days.

(21) Appl. No.: 09/105,687

(22) Filed: Jun. 26, 1998

(30) Foreign Application Priority Data

Jun. 27, 1997 (JP) .................................................... 9-172514

(51) Int. Cl.[7] ........................................................ G11B 5/09
(52) U.S. Cl. ...................................................................... 360/51
(58) Field of Search ........................................ 360/51, 46

(56) References Cited

FOREIGN PATENT DOCUMENTS 7-147059   6/1995   (JP) ................................ G11B/20/10

*Primary Examiner*—W. Chris Kim
(74) *Attorney, Agent, or Firm*—G. Marlin Knight

(57) ABSTRACT

To realize simplification of the structure and high reliability in the disk drive. When a position of a target sector on a disk 2 is detected while skipping data sectors including a first region which is written using a first read/write clock (RDWTCLK) and a second region which is written using a second read/write clock, a controller 5b in a HDC 5 presets to a counter 5a an offset value which is based on the length of a sector to be skipped and a difference in the frequency between the first and the second RDWTCLKs and counts the first RDWTCLK fed from a CLK generator 4d of a channel IC 4 to detect the position of the target sector.

8 Claims, 10 Drawing Sheets

FIG.12

| NUMBER OF DATA BYTES IN PRECEDING PART | | NUMBER OF DATA BYTES IN REMAINING PART | | DIFF. | |
|---|---|---|---|---|---|
| | | | | | |
| | | | | | |
| 510 | 1FEH | 2 | 02H | 0 | 00H |
| | | | | | |
| 355 | 163H | 157 | 9DH | 10 | 0AH |
| | | | | | |
| 80 | 50H | 432 | 1B0H | 25 | 19H |
| | | | | | |
| | | | | | |
| | | | | | |
| 0 | 0H | 512 | 200H | 30 | 1EH |

FIG.13

| CURPTR | ADDRESS | OFFSET | |
|---|---|---|---|
| | | | |
| 80H | 3080H | | |
| 7FH | 307FH | | |
| | | | |
| 66H | 3066H | 0 | 00H |
| | | | |
| 47H | 3047H | 10 | 0AH |
| | | | |
| 10H | 3010H | 25 | 19H |
| | | | |
| 03 | 3003H | | |
| 02 | 3002H | | |
| 01 | 3001H | | |
| 00 | 3000H | 30 | 1EH |

DISK UNIT AND READ/WRITE CONTROL METHOD

BACKGROUND OF THE INVENTION

1. Field of the Invention

The present invention relates to a disk drive which is used as an auxiliary storage device for an information processing system and a writing control method, and in particular, to the disk drive and a read/write control method which offers a simplification in the structure of the drive and high reliability.

2. Description of Related Art

Various techniques to improve a recording density are employed in hard disk drives which are used as auxiliary storage devices for information processing systems.

A known example of these techniques is a multi-zone bit recording technique disclosed in, for example, Japanese Patent Kokai Publication No. 147059/1995. In this technique, a recording surface of a magnetic disk is radially divided into several regions (zones Z1, Z2 and Z3) as shown in FIG. 2, and the number of data sectors which are located between servo sectors is varied in accordance with the radial position of each zone so that the recording density in each zone, as viewed in the direction of track length of recording tracks, can be made uniform. In this multi-zone bit recording technique, a format is available in which no data sectors (D) are divided by the servo sectors (S) as shown in FIG. 2, and in addition, another format is also available in which some data sectors (D) are divided by the servo sectors (S) as shown in FIG. 3 which is sometimes called a split data field design.

In the hard disk drive which employs the multi-zone bit recording technique, a writing position of each sector is determined using the length of time which has passed since the reading of an immediately preceding servo sector. Since the disk is accurately controlled to rotate at a given number of revolutions during reading/writing, the length of time mentioned above may be determined by providing an oscillator which generates a clock for position detection and counting an output from the oscillator. However, it may also be determined by counting data reading and writing clock (RDWTCLK). The position detection by counting the RDWTCLK offers a simplification in the structure of the drive.

As shown in FIG. 4(a), each data sector is composed of a SYNC+DAM section at which a sync signal (SYNC), an identification information (DAM) for identifying each sector and other information are written, and a DATA+ECC section at which data (DATA) and an error correction code (ECC) are written. As shown in FIG. 4(b), the information is written in each of the SYNC+DAM section and the DATA+ECC section using the RDWTCLK of the constant frequency.

When the RDWTCLK used in the DATA+ECC section is chosen to be of a higher frequency than that used in the SYNC+DAM section as shown in FIG. 5(a) and FIG. 5(b), the data recording density can be increased. Thus the RDWTCLK used in the DATA+ECC section has a different frequency from that of the RDWTCLK used in the SYNC+DAM section. When no reading/writing operation is performed on the recording track, the RDWTCLK of either frequency is generated. Normally, the SYNC+DAM section precedes in the reading/writing operation, and accordingly its associated RDWTCLK is generated.

In such an instance, if the reading/writing operation is started with a sector (as exemplified by XXX in FIG. 2) which immediately follows a servo sector, there would not be presented any substantial difficulty when the sector position is detected using the RDWTCLK associated with the SYNC+DAM section since any resulting positional difference will be minimal.

However, if the reading/writing operation is started with a servo sector (as exemplified by YYY in FIG. 2) which is located intermediately between the neighboring servo sectors, it will be seen that a read operation from a recording track is not performed until the magnetic head arrives at the intended sector by passing a sector or sectors which are interposed therebetween. Accordingly, the position of the intended sector must be detected using the RDWTCLK in the reading/writing operation of either the SYNC+DAM section or DATA+ECC section. Because the information is written in the SYNC+DAM section and the DATA+ECC section with mutually different clocks, it will be seen that there results in a significant difference in the detected position if only one clock is used in the detection.

To give an example, when it is desired to start the reading/writing operation of data from a sector 12 shown in FIG. 6(a), because the reading of a sector 11 (DATA 2) is not performed, the RDWTCLK used during the writing in the SYNC+DAM section will be used in detecting the position of the target sector 12. If the position where the sector 12 begins is then determined using such the RDWTCLK and a count (such as the number of bytes in the DATA 2) as usual, the detected position will go past beyond the leading portion of the sector 12, as indicated in FIG. 6(b).

For this reason, it is necessary to detect the beginning position of the target sector by either providing an oscillator which generates a position detecting clock and counting an output from the oscillator as mentioned above or providing oscillators which generates two different RDWTCLKs (RDWTCLK during the write operation in the SYNC+DAM section and RDWTCLK during the write operation in the DATA+ECC section) and counters which counts respective oscillator outputs and causing the HDC to suitably control the coefficient of the counters.

SUMMARY OF THE INVENTION

However, the provision of the oscillator, the counter and other components only for purpose of detecting the beginning position of the target sector results in increasing the drive cost unnecessarily, and adding to the complexity of the structure of the drive, and leaving much to be improved in respect of the reliability. Accordingly, it is an object of the present invention to contribute to reducing the cost and improving the reliability of the disk drive.

A disk drive according to the present invention has a disk-shaped record medium including a plurality of servo regions radially extending on a recording surface, data regions formed by dividing the recording surface by the servo regions, zones formed by dividing radially the data regions, and data sectors which number depends on a radial position on the recording surface and which includes a first region in which reading or writing is made on the basis of a clock (a first clock) of a first frequency and a second region in which reading or writing is made on the basis of a clock (a second clock) of a second frequency. The disk drive also has reference clock generator for generating a reference clock of the first frequency, at least when reading and writing are not made in the data sectors; target sector detector for counting the first clock from the reference clock generator to detect a position of the data sector (a target sector) for which reading or writing is commanded; compensator for compensating for a difference in the detected position of the target sector, said difference in the detected position being produced as a result of a difference in the frequency between the first clock and the second clock; and read/write controller for reading or writing data in the sector located at the position detected by the target sector detector.

Further, servo sectors are written in the servo regions; and the target sector detector may count the first clock to measure a length of time passed since the reading of the servo sector, thereby detecting the position of the target sector.

Furthermore, each of the data regions contains a predetermined number of data sectors, some of which are divided at an arbitrary position by the servo regions. The predetermined number is not limited to an integer. The disk drive may have a first non-volatile memory for storing information relating to positions where the data sectors are written, presence or absence of division of the each data sector and positions where the data sectors are divided, and the target sector detector may determine a sector or sectors located between the servo sector and the target sector by referring to the first non-volatile memory and performs said counting operation regarding the determined sector to detect the position of the target sector. In addition, the compensator may include a second non-volatile memory for storing a table which indicates a relationship between the position of division of the divided data sector (or a length of the divided data sector) and contribution to the difference in the position where the target sector is detected, and compensates for the difference resulting from the divided data sector by referring to second non-volatile memory if there is the divided data sector among sectors which have been detected by the target sector detector as being located between the servo sector and the target sector.

Moreover, the disk drive may be made in such a way that the read/write controller reads or writes the data sectors according to a first encoding scheme when the reading or writing operation is performed in the first region, and reads or writes the data sectors according to a second encoding scheme when the reading or writing operation is performed in the second region; and the reference clock generator generates the clock of the first frequency when the first encoding scheme is used by the read/write controller or when no reading and writing operation is performed in the data sector, and generates the clock of the second frequency when the second encoding scheme is used by the read/write controller.

Further, a method according to the present invention relates to a method of controlling a reading/writing operation in a disk drive. The disk drive has a disk-shaped record medium including a plurality of servo regions radially extending on a recording surface, data regions formed by dividing the recording surface by the servo regions, zones formed by dividing radially the data regions, and data sectors which number depends on a radial position on the recording surface and which includes a first region in which reading or writing is made on the basis of a clock (a first clock) of a first frequency and a second region in which reading or writing is made on the basis of a clock (a second clock) of a second frequency. The method comprises the steps of: generating a reference clock of the first frequency, at least when reading or writing are not done in the data sectors; detecting a position of the data sector (a target sector) for which reading or writing is commanded by counting the first clock from the reference clock generator; compensating for a difference in the position where the target sector is detected, said difference in the detected position being produced as a result of a difference in the frequency between the first clock and the second clock; and reading or writing data in the sector located at the position detected by the data sector detector.

BRIEF DESCRIPTION OF THE DRAWINGS

FIG. 12 is a diagram showing a relationship between a position where the date sector is divided and the detected difference in the disk drive according to the embodiment of the present invention; and FIG. 13 is a diagram showing an example of a table which is used in adjusting the detected position of the target sector in the disk drive according to the embodiment of the present invention.

DETAILED DESCRIPTION OF THE PREFERRED EMBODIMENT

Figure 1:
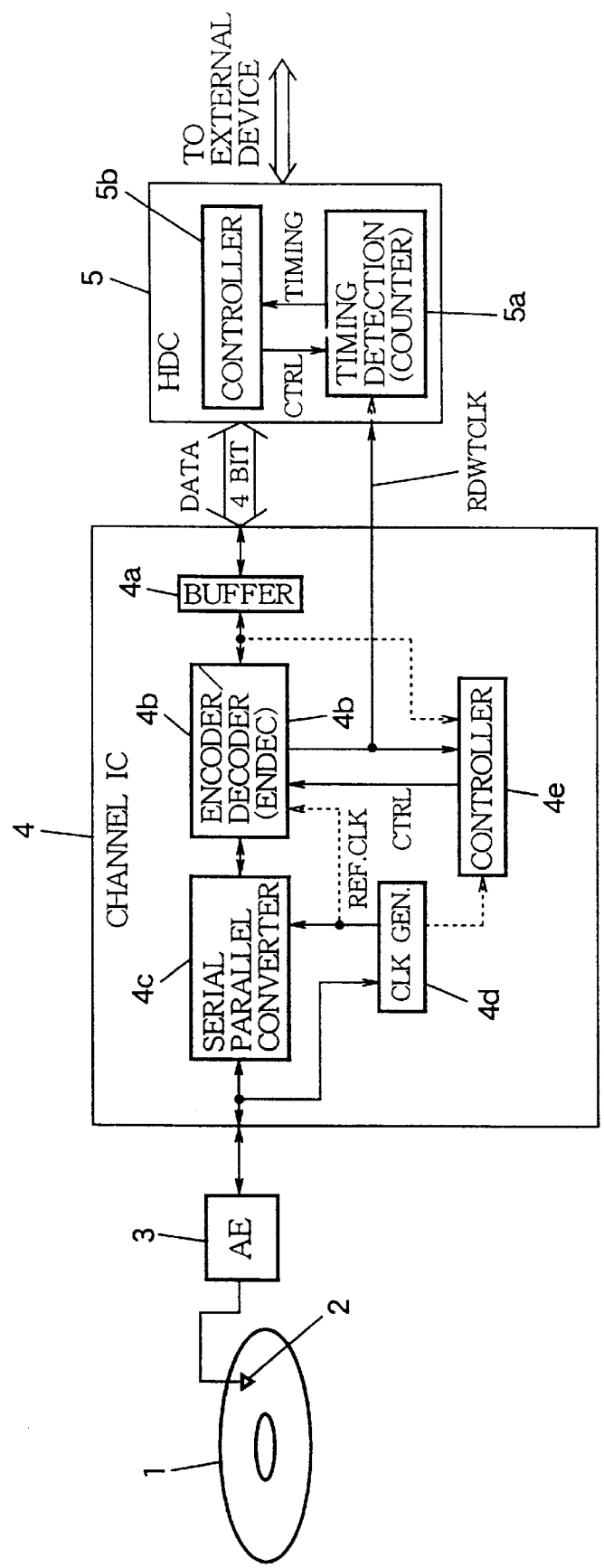
FIG. 1 is a block diagram showing components of a disk drive according to an embodiment of the present invention.
Figure 2:
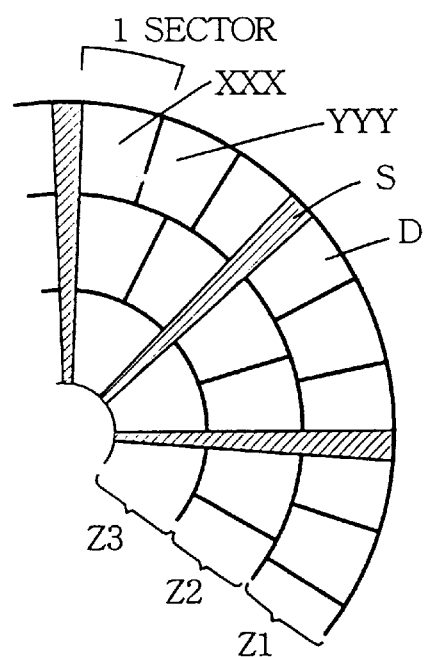
FIG. 2 is an illustration showing an example of a recording format on a magnetic disk of a conventional disk drive.
Figure 3:
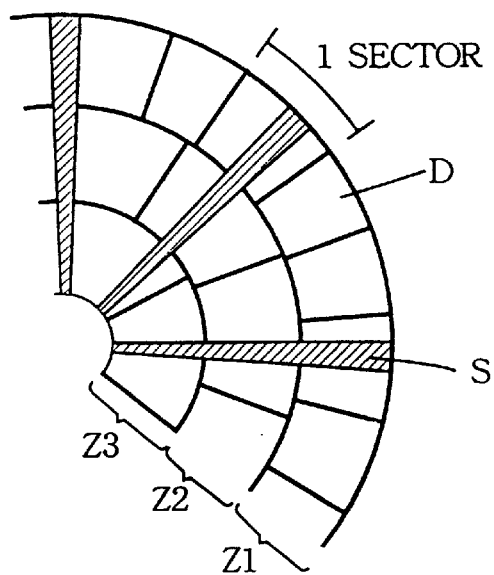
FIG. 3 is an illustration showing another example of a recording format in a conventional disk drive.
Figure 4:
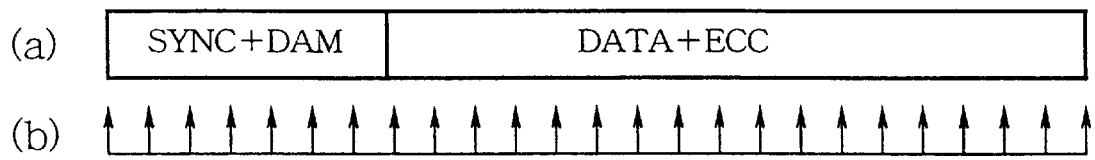
FIG. 4 is an illustration showing an example of a recording format for data sector in a conventional disk drive.
Figure 5:
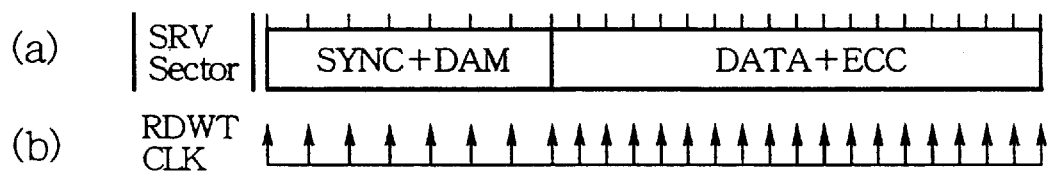
FIG. 5 is an illustration showing another example of a recording format for data sector in a conventional disk drive.

FIG. 1 shows a disk drive to which the present invention is applied. The disk drive has a magnetic disk 1 as a record medium (i.e., a disk-shaped record medium), one or more magnetic read and write head(s) 2 which read/write data on the magnetic disk 1, an AE 3 which supplies a signal to be written to the magnetic head 2 and picking up (and amplifying) an output read by the magnetic head 2, a channel IC (a read/write controller) 4 which performs a conversion between an analog signal and a digital data, and a hard disk controller (referred to as an HDC, and including a target sector detector and a compensator) 5 which controls an operation of the whole unit including the channel IC 4 and other components.

Figure 7:
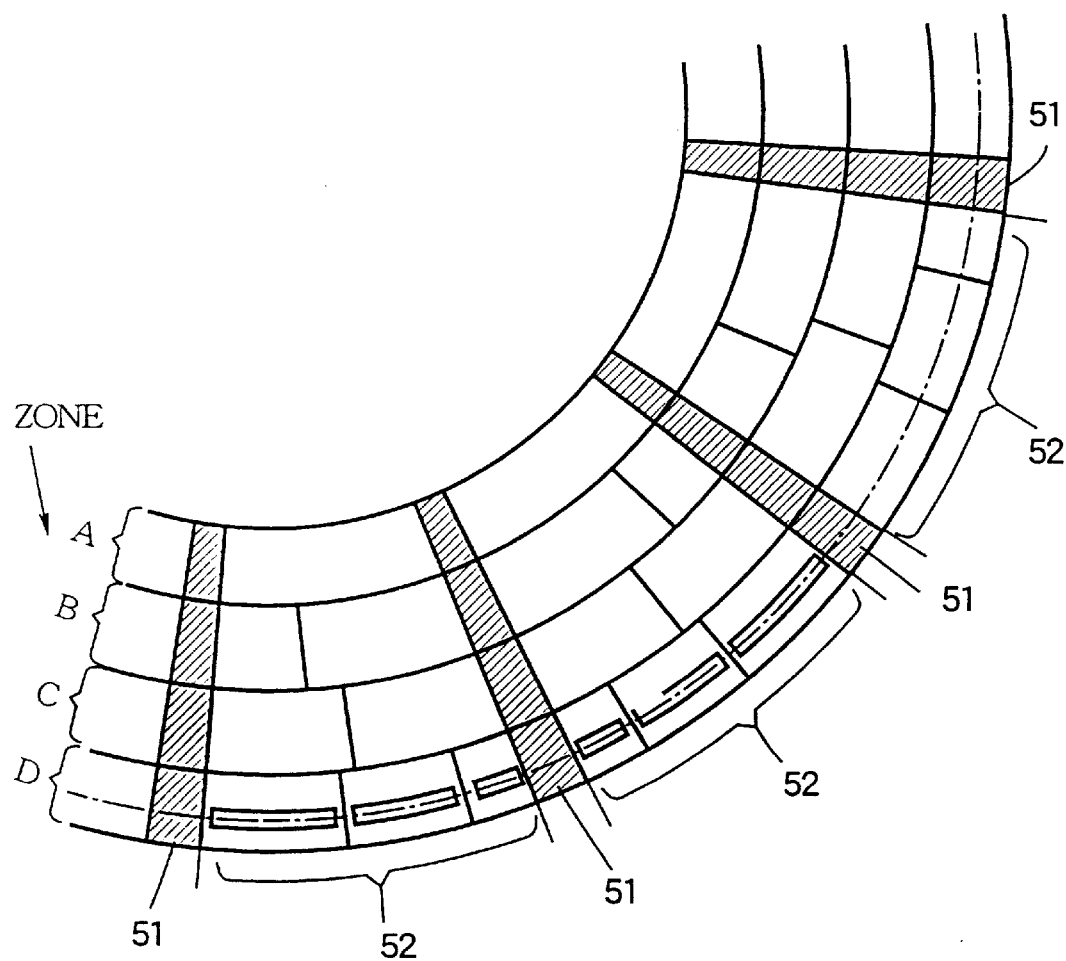
FIG. 7 is an illustration showing an example of a recording format on a magnetic disk in the disk drive according to the embodiment of the present invention.

As shown in FIG. 7, the magnetic disk 1 has a recording surface including servo regions 51 which are distributed circumferentially at a given angular interval (for example, 360 degrees/66) and in which physical servo sectors are written, and data regions 52 in which data sectors are written. A physical servo sector, which comprises identification data for identifying each physical servo sector (for example, a cylinder ID (CYLID), physical sector number (PHSN) and the like), a servo pattern and other data, is formed in each servo region 51 previously, for example, during the manufacture.

The physical servo sectors are written in the servo regions using a clock of a given frequency which does not depend on the radial position during the manufacture. Data sectors are read/written in the data regions using a clock (reference clock) of a frequency depending on the radial position (for example, zone or the like), either by a user or by a system.

The recording surface has plural zones formed by radially dividing the recording tracks into a plurality of groups. The number of data sectors which are written into one track is set for each zone. By way of example, FIG. 7 shows that one track in a zone A between the neighboring servo regions 51 contains 1 data sector, one track in a zone B between the neighboring servo regions 51 contains 1.5 data sectors, one track in a zone C between the neighboring servo regions 51 contains 2 data sectors, and one track in a zone D between the neighboring servo regions 51 contains 2.5 data sectors.

Figure 8:
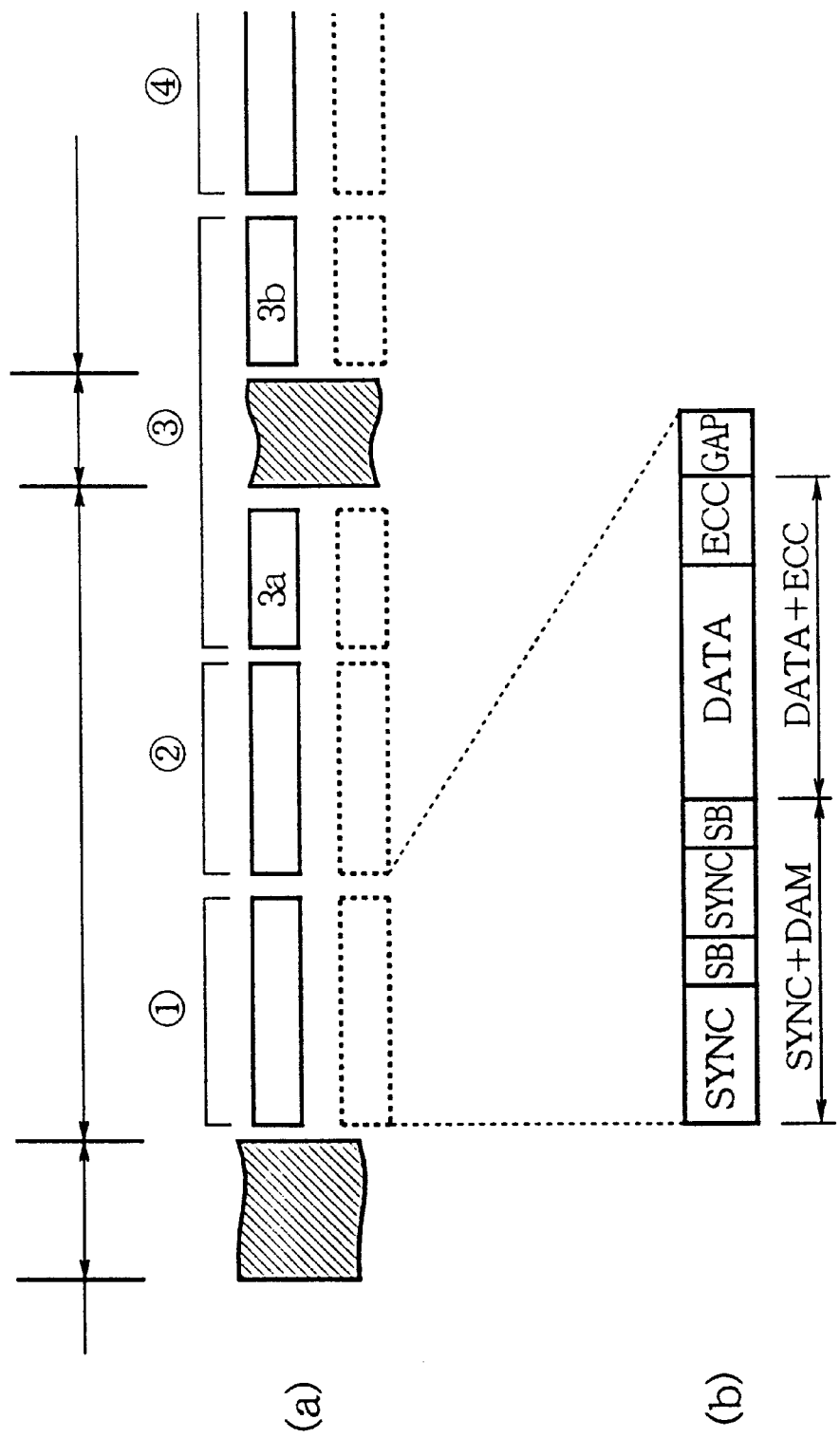
FIG. 8 is an illustration showing details of the recording format in the disk drive according to the embodiment of the present invention.
Figure 9:
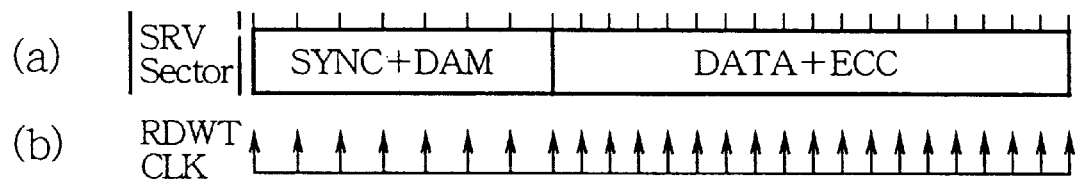
FIG. 9 is an illustration showing an example of the recording format for data sector in the disk drive according to the embodiment of the present invention.

In this manner, the number of data sectors contained between the neighboring servo regions 51 is not limited to an integer, but the data sector may be divided at an arbitrary position into two parts, which are respectively written in the different data regions, as shown in FIG. 7 and FIG. 8(a). Thus the position where the data sector is divided can be uniquely determined from the number of the data sectors written in the each data region 52, which is determined with respect to the each zone, and the position of the each data region 52 which is indicated by the physical sector number. Information indicating a position at which the data sector is divided (for example, information indicating that an n-th sector in a zone is divided by an m-th physical servo sector in such a manner that p bytes are written before the m-th physical servo sector while q bytes are written after the m-th physical servo sector, where n, m, p and q are integers not less than 1) is written, together with information which indicates the positions of the respective data sectors and presence or absence of such division, in a non-volatile memory contained in the HDC 5 or in a given area on the disk (referred to as a first non-volatile memory), and is read out and stored in an RAM or the like which is contained in the HDC 5 during the operation. When a particular data sector is specified and either a writing or reading operation is commanded, the HDC 5 reads out the position of the specified data sector and controls the writing or reading operation.

As shown in FIG. 8(b), each data sector comprises a SYNC section, an SB (DAM) section, a DATA section, an ECC section and a GAP section. A sync signal is written in the SYNC section, information for identifying the each data sector and other information are written in the SB (DAM) section, data is written in the DATA section, and an error correction code for the data written in the DATA section is written in the ECC section. Further, the GAP section means a write/read margin.

As shown in FIG. 1, the channel IC 4 comprises a buffer 4a which holds data from or to the HDC 5, an encoder/decoder (ENDEC) 4b which encodes data to be written and decodes data being read out, a serial/parallel converter 4c which converts the encoded signal to be written into a serial signal and converts the signal being read out into parallel data, a CLK generator 4d which generates a read/write reference clock (to which RDWTCLK is referenced), and a controller 4e which controls an operation of the entire channel IC 4.

During the reading of the physical servo sector, the CLK generator 4d generates a reference clock on the basis of the output read from a recording track which is fed from the AE 3, and the serial/parallel converter 4c and the ENDEC 4b read the servo sector on the basis of the generated reference clock. The controller 4e controls the frequency of the reference clock generated by the CLK generator 4d during the reading/writing of the data sectors in accordance with a CYL-ID which is read by a servo sector reading system, thus generating a reference clock of a given frequency which depends on the radial position of the disk.

Data fed in parallel (four bits) from the HDC 5 is once held in the buffer 4a. The ENDEC 4b reads a given number of data bits to encode them (i.e., convert them into a code which has no consecutive zeros or ones) under control of the controller 4e. Further, the ENDEC 4b also generates a clock (RDWTCLK) for reading and writing data. The serial/parallel converter 4c converts the encoded data from the ENDEC 4b into a serial signal in accordance with the reference clock, and feeds it to the magnetic head 2 through the AE 3.

The signal read by the magnetic head 2 is fed to the channel IC 4 through the AE 3. The serial/parallel converter 4c generates a clock from the output read by the magnetic head 2, and converts the serial signal (the output being read) into the parallel data on the basis of this clock (or more precisely, a reference clock generated by the CLK generator 4d on the basis of this clock). The output converted into parallel data is decoded by the ENDEC 4b to feed the HDC 5 through the buffer 4a.

The HDC 5 comprises a counter 5a which counts the RDWTCLK from the channel IC 4 in order to control a read/write timing and the like, and a controller 5b which serves a timing control and the like.

The above-mentioned ENDEC 4b operates according to 8/9 and 16/17 encode techniques. Although a pattern having many consecutive zeros or ones (For example, eight zeros appear in succession for 00H.) appears in a usual data, such a pattern is an obstacle when a clock is generated from the output read by the magnetic head 2. Accordingly, data to be written are composed of a group of patterns which have excluded patterns including a consecutive succession of many zeros or ones. Data comprising such the group of patterns do not interfere with the generation of the clock.

The 8/9 encode technique employs a conversion from data comprising eight bits to data comprising nine bits, and the 16/17 encode technique employs a conversion from sixteen bits data to seventeen bits data. Since the reference clock which is used during the conversion of the encoded data into the serial signal remains uniform from track to track, the 16/17 encode technique affords a greater capability to record more data.

In order to improve the recording density on the magnetic disk 2, it is desirable that the 16/17 encode technique be applied over the entire data regions. However, it has been generally the conventional practice to employ the 8/9 encode technique, and accordingly, to realize the 16/17 encode technique when writing data in the SYNC+DAM section, a read/write control by the controller 4e must be changed, which requires a long time for its implementation. In addition, different internal processing schemes are used between the SYNC+DAM section and the DATA+ECC and GAP sections. Accordingly, in the present invention, only the encode technique in the DATA+ECC section is changed to the 16/17 encode technique, thereby achieving an improvement in the recording density in a facilitated manner.

Figure 6:
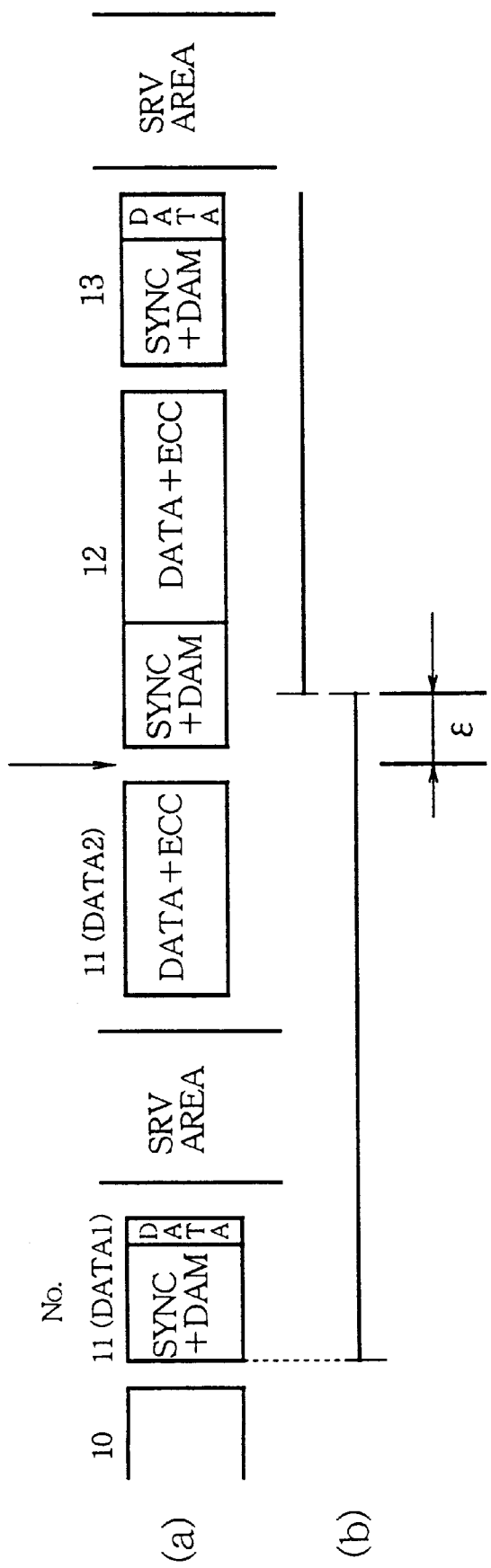
FIG. 6 is an illustration showing a manner of detecting a target sector in a conventional disk drive.

In the conventional practice, the leading position of a data sector to be read/written has been detected by counting the RDWTCLK in order to allow the controller 4e and other components to be simplified. However, because the actual RDWTCLK in the DATA+ECC section runs faster than that in the SYNC+DAM section, if the same count of the RDWTCLK as in the conventional practice is relied upon in order to determine the leading position of the sector, a difference is produced as illustrated in FIG. 10 or as epsilon ($\epsilon$) in FIG. 6.

Figure 10:
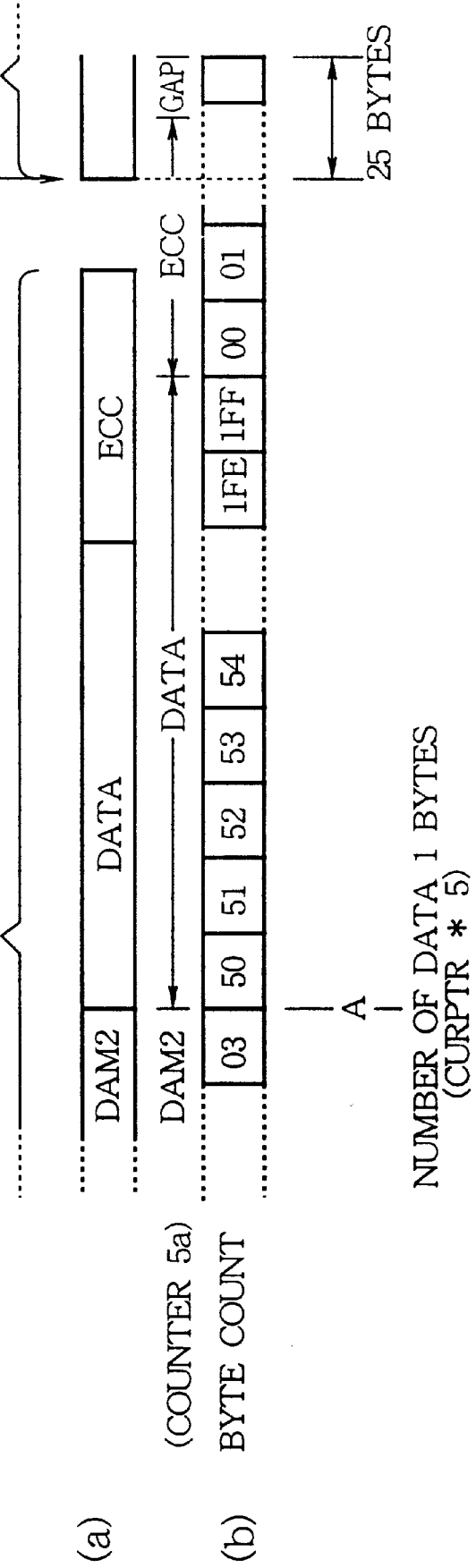
FIG. 10 is an illustration showing how a difference occurs in the detection of a target sector in a conventional disk drive.
Figure 11:
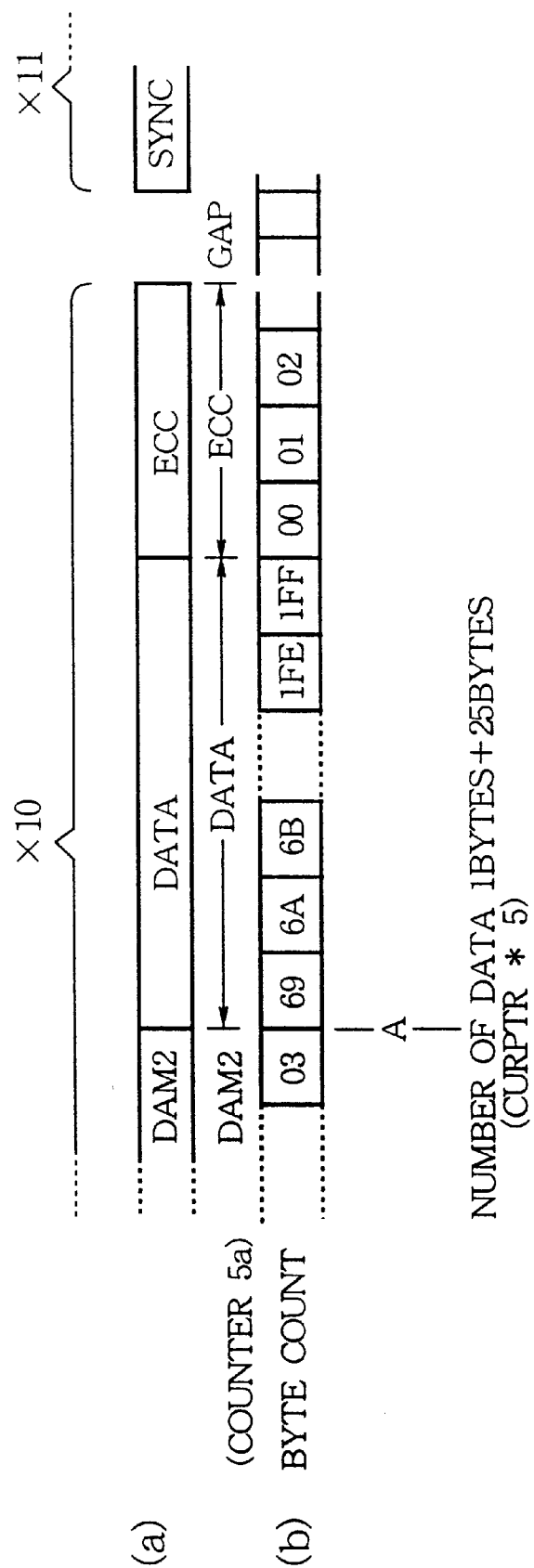
FIG. 11 is an illustration showing a manner of adjusting the detected position of the target sector in the disk drive according to the embodiment of the present invention.

Referring to FIG. 10, it is assumed that 80 bytes of data are written in a preceding part of a divided data sector x10 in the data region, and the remaining data including 432 bytes of data and ECC data are written in the subsequent (or remaining) part of the divided data sector x10 in the data region. Such information is written in the non-volatile memory or other device contained in the HDC 5, and hence the HDC 5 is capable of knowing information concerning the division in the data sector for which the reading/writing operation is commanded by referring to the non-volatile memory. When it is desired to detect the leading position of the next data sector x11 (target sector) under this condition, after a given number of bytes in the SYNC+DAM section of the subsequent part of the divided data sector X10 is counted by the counter 5a, the controller 5b in the HDC 5 causes the counter 5a to be preset to a count (50H) representing a number of data bytes written in the data sector of the preceding part of the data sector X10, which is equal to 80, and thereafter the counter 5a begins counting the RDWTCLK fed from the channel IC 4. It is to be understood that the count value of the counter 5a shown in FIG. 10(b) represents the number of bytes, and one count corresponds to two clocks of actual RDWTCLK.

There occurs an offset corresponding to one reference clock (namely, one bit) for every second byte between the 8/9 and the 16/17 encode technique. Accordingly, when the clock according to the 8/9 encode technique is simply counted for the number of bytes (which is equal to 432 bytes) written in the subsequent part of the divided data sector x10, the detected leading position of the target sector (namely, the position reached by the magnetic head at the end of the counting operation) will have passed the actual leading position of the target sector by an amount corresponding to 216 clocks. This is equivalent to 25 bytes of decoded data according to the 16/17 encode technique (which is obtained by 216/17*16/8=25.4 bytes).

Since the RDWTCLK is switched between the SYNC+DAM section and the DATA+ECC section in accordance with the encode technique, the frequency ratio of the RDWTCLK remains unchanged between the SYNC+DAM section and the DATA+ECC section even if the frequency of the reference clock changes with the radial position. Consequently, a difference represented in terms of a number of bytes remains constant independently from the position on the disk.

It will therefore be seen that if a difference in a counted value is compensated for in consideration of the offset when detecting the leading position of the target sector, the sector position can be detected in a manner substantially free from the offset by merely counting the RDWTCLK. Specifically, after the given number of bytes in the SYNC+DAM section has been counted, the controller 5b in the HDC 5 employs a number of data bytes (which is equal to 80 bytes=50H in the above-mentioned case) written in the preceding part of the divided data sector added with an adjustment value (which is equal to 25 bytes=19H in the above-mentioned case) as an initial value for the counter 5a. Then the RDWTCLK is counted until the count value reached the total number of bytes in the DATA+ECC section (which is equal to 512 bytes=200H), whereupon the RDWTCLK in the ECC section is counted. Note that counting down to zero is an equivalent technique.

When the initial value set beforehand in the counter is adjusted in the manner mentioned above, a difference in the detected position of the target sector which results from different frequencies of the RDWTCLK can be compensated for, allowing the leading position of a following sector to be detected accurately. With this adjustment, the disk drive of this embodiment can eliminate the necessity of providing the clock generator and its associated counter for detecting the position of the target detector or the position detecting system including the second clock counter and its associated counter controller, which are required in the conventional practice in order to record the data sector the respective data sectors using the frequencies which vary in accordance with the regions. This contributes to reducing the cost of the disk drive. Because the need for the position detecting system is eliminated, this also contributes to improving the reliability of the disk drive.

A difference in the detected position corresponds to 256 clocks or 30 bytes of data (which is obtained by 256/17*16/8=30.1 bytes) and remains constant if the data sector is not divided and has a regular length (which is equal to a length of 512 bytes for the DATA+ECC section). However, if the data sector is divided, the difference in the detected position changes depending on the length of the DATA+ECC section. For example, if 80 bytes of data are written in the preceding part of the divided data sector and the subsequent part of the divided data sector (in which 432 bytes of data are written) is skipped, a difference in the detected position corresponds to 25 bytes as mentioned previously. When the length of the DATA+ECC section is equal to zero, the difference in the detected position will also be equal to zero.

Thus, since the frequency ratio of the RDWTCLK between the SYNC+DAM section and the DATA+ECC section remains constant as mentioned above, as illustrated in FIG. 12 in terms of a number of bytes, a fixed relationship is obtained between the length of the DATA+ECC section contained in the data sector and the difference in the detected position. Accordingly, the difference in the detected position of the target sector which corresponds to the number of data bytes written in the preceding part of the divided data sector may be obtained beforehand and added, as the adjustment value, to a preset value in the counter 5a (namely, the number of data bytes written in the preceding part of the divided data sector) before initiating a counting operation, thus allowing the leading position of the target sector to be accurately detected.

Incidentally, the disk drive unit of this embodiment is constructed in such a way that the data sector can be divided at every position in increments of five bytes from the leading end of the DATA+ECC section. Thus the position of division is variable in a range from 0 representing the absence of the division to 102 (66H) where 510 bytes of data as well as the ECC are written in the preceding part of the divided data sector. Thus, in this case, a total number of the adjustment values is about 102 (66H) at maximum. If the disk drive unit is constructed in such a way that the data sector can be divided at every position in increments of one byte from the leading end of the DATA+ECC section, a total number of the adjustment values will be 512 (200H) at maximum.

A difference can be calculated for each position of division previously, and registered in a table against a key, which comprises a parameter CURPTR (position of division/5), as shown in FIG. 13. The controller 5b of the HDC 5 is then enabled to determine the difference easily from the position of the division in the data sector (or the number of data bytes stored in the preceding part of the divided data sector) to modify the count value. The table is stored in the non-volatile memory or a given region on the disk (first non-volatile memory), and is read from it and written into an RAM contained in the HDC 5 during operation. In the case shown in FIG. 13, each OFFSET value (a modification value of the count value) of the table is written at an address of 3000H+CURPTR. In the case that the table is stored in a given region on the disk, if the number of sectors to be written in a data region of each zone or the frequency ratio of the RDWTCLK between the SYNC+DAM section and the DATA+ECC section are changed, an accommodation can be facilitated by rewriting the table. Since the number of the adjustment values is about 102 (66) at maximum as mentioned above, this does not constitute any substantial consumption of memory resource in the HDC 5.

When the target sector is specified and the data reading/writing operation is commanded, the controller 5b refers to information indicating the position of each data sector, the presence or absence of any division and the position of division which is already written into an RAM or the like from the non-volatile memory or the given region on the disk as mentioned above, determines the number of data sectors located between the servo sector and the target sector on the basis of such information, and controls a skipping operation over these data sectors. Specifically, after the servo sector is detected, the counting is performed in accordance with data sectors which are to be skipped.

In the event the divided data sector is present, the preset value of the counter 5a is adjusted in accordance with information (CURPTR) which indicates the position of division. More specifically, an OFFSET value is read out from an address corresponding to a base address (which is 3000H in the instance shown in FIG. 13) to which the CURPTR is added. A value indicating the position of division (CURPTR×5) is added to the OFFSET value, and then the sum provides the preset value for the counter 5a. When the counting operation is based on such the preset value, it is possible to compensate for the difference which is attributable to different frequencies of the RDWTCLK between the SYNC+DAM section and the DATA+ECC section and to detect an accurate position of the target sector.

When the differences (OFFSET) are stored as a table in the non-volatile memory in relation to the position of division of the data sector, a need for an arithmetic unit which calculates the differences is eliminated, by reading an OFFSET value corresponding to a particular position of division and using it to adjust the count value. This contributes to reducing the cost and improving the reliability of the drive as a result of avoiding an increase in the number of parts.

While the present invention has been described as applied to a disk drive unit including a magnetic disk in the above description of the embodiment, it should be understood that the record medium is not limited to the magnetic disk. The present invention is also applicable to a disk-shaped record medium such as an optical disk, for example, as long as a plurality of recording frequencies (RDWTCLK) are used.

Further, in the above description of the embodiment, the RDWTCLK is changed by switching the encode technique depending on the use of data sectors. However, the present invention is also applicable where rather than switching the encode technique, the oscillation frequency of an oscillator which generates a reference clock is changed depending on the use of data sectors as far as the a given relationship is maintained for the frequency ratio (as when the frequency division ratio of the base clock is changed, for example).

EFFECT OF THE INVENTION

In the present invention, the target sector detector counts the first clock from the reference clock generator to determine the position of the data sector (target sector) for which the reading or writing operation is commanded, and the compensator compensates for the difference in the detected position of the target sector which is produced as a result of a difference in the frequency between the first clock and the second clock. Accordingly, the present invention can eliminate the necessity of providing the clock generator and its associated counter for detecting the position of the target detector or the position detecting system including the second clock counter and its associated counter controller, which are required in the conventional practice in order to record the data sector the respective data sectors using the frequencies which vary in accordance with the regions. This contributes to reducing the cost of the disk unit. Because the need for the position detecting system is eliminated, this also contributes to improving the reliability of the disk drive.

We claim:

1. A disk drive comprising:

a disk-shaped record medium including a plurality of servo regions radially extending on a recording surface, data regions formed by dividing the recording surface by the servo regions, zones formed by dividing radially the data regions, and data sectors which number depends on a radial position on the recording surface and which includes a first region in which reading or writing is performed using a first clock of a first frequency and a second region in which reading or writing is performed using a second clock of a second frequency;

a reference clock generator for generating the first clock of the first frequency;

a target sector detector for counting the first clock to detect a position of the data sector (a target sector) for which reading or writing is commanded;

a compensator for compensating for a difference in the detected position of the target sector, said difference in the detected position being produced as a result of a difference in the frequency between the first clock and the second clock; and a read/write controller for reading or writing data in the sector located at the position detected by the target sector detector.

2. A disk drive according to claim 1, wherein:

servo sectors are written in the servo regions; and the target sector detector counts the first clock to measure a length of time passed since the reading of the servo sector, thereby detecting the position of the target sector.

3. A disk drive according to claim 2, wherein each of the data regions contains a predetermined number of data sectors, some of which are divided at an arbitrary position by the servo regions, said predetermined number is not an integer for at least one data region;

the disk drive further comprising a first nonvolatile memory for storing information relating to positions where the data sectors are written, presence or absence of division of the each data sector and positions where the data sectors are divided;

wherein the target sector detector determines a sector or sectors located between the servo sector and the target sector by referring to the first nonvolatile memory and performs said counting operation regarding the determined sector to detect the position of the target sector; and wherein the compensator includes a second nonvolatile memory for storing a table which indicates a relationship between the position of division of the divided data sector (or a length of the divided data sector) and contribution to the difference in the position where the target sector is detected, and compensates for the difference resulting from the divided data sector by referring to the second nonvolatile memory if there is any divided data sector among the sectors which have been detected by the target sector detector as being located between the servo sector and the target sector.

4. A disk drive according to claim 1, wherein:

the read/write controller reads or writes the data sectors according to a first encoding scheme when the reading or writing operation is performed in the first region, and reads or writes the data sectors according to a second encoding scheme when the reading or writing operation is performed in the second region; and the reference clock generator generates the clock of the first frequency when the first encoding scheme is used by the read/write controller or when no reading and writing operation is performed in the data sector, and generates the clock of the second frequency when the second encoding scheme is used by the read/write controller.

5. A method of controlling a reading/writing operation in a disk drive, the disk drive having a disk-shaped record medium including a plurality of servo regions radially extending on a recording surface, data regions formed by dividing the recording surface by the servo regions, zones formed by dividing radially the data regions, and data sectors which number depends on a radial position on the recording surface and which includes a first region in which reading or writing is made on the basis of a clock (a first clock) of a first frequency and a second region in which reading or writing is made on the basis of a clock (a second clock) of a second frequency;

said method comprising the steps of:

generating a first clock of the first frequency, at least when not reading and writing the data sectors;

detecting a position of the data sector (a target sector) for which reading or writing is commanded by counting the first clock;

compensating for a difference in the position where the target sector is detected, said difference in the detected position being produced as a result of a difference in the frequency between the first clock and the second clock; and reading or writing data in the sector located at the position detected by the data sector detecting.

6. A method of controlling a reading/writing operation according to claim 5, wherein:

servo sectors are written in the servo regions; and in the step of detecting the target sector, the first clock is counted to measure a length of time passed since the reading of the servo sector, thereby detecting the position of the target sector.

7. A method of controlling a reading/writing operation according to claim 6, wherein:

each of the data regions contains a predetermined number of data sectors, some of which are divided at an arbitrary position by the servo regions, said predetermined number is not limited to an integer;

in the step of detecting the target sector, a sector or sectors located between the servo sector and the target sector are determined by referring to a first nonvolatile memory, which stores information relating to positions where the data sectors are written, presence or absence of division of each data sector and positions where the data sectors are divided, and said counting operation regarding the determined sector is performed to detect the position of the target sector; and in the step of compensating for the difference, the compensation for the difference resulting from the divided data sector is performed by referring to the second nonvolatile memory if the divided data sector is among sectors which have been detected by the target sector detector as being located between the servo sector and the target sector, the second nonvolatile memory storing a table which indicates a relationship between the position of division of the divided data sector (or a length of the divided data sector) and contribution to the difference in the position where the target sector is detected.

8. A method of controlling a read/write according to claim 5, wherein:

in the step of controlling the reading/writing operation, the reading or writing operation in the data sector is performed according to a first encoding scheme when the reading or writing operation is performed in the first region, and the reading or writing operation in the data sector is performed according to a second encoding scheme when the reading or writing operation is performed in the second region; and in the step of generating the first clock, the clock of the first frequency is generated when the first encoding scheme is used by the read/write controller or when no reading and writing operation is performed in the data sector, and the clock of the second frequency is generated when the second encoding scheme is used by the read/write controller.

* * * * *